US006857046B1

(12) United States Patent
Batcher

(10) Patent No.: US 6,857,046 B1
(45) Date of Patent: Feb. 15, 2005

(54) CACHING FOR CONTEXT SWITCHING APPLICATIONS

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 10/109,318

(22) Filed: Mar. 28, 2002

(51) Int. Cl.[7] .............................................. G06F 12/00
(52) U.S. Cl. ..................................... 711/129; 711/158
(58) Field of Search ................................ 711/129, 158, 711/141–144, 133, 173; 712/22, 228; 709/104–109, 206; 370/235

(56) References Cited

U.S. PATENT DOCUMENTS

| | | | | |
|---|---|---|---|---|
| 5,537,635 A | * | 7/1996 | Douglas ...................... | 711/129 |
| 5,757,771 A | * | 5/1998 | Li et al. ...................... | 370/235 |
| 5,787,490 A | * | 7/1998 | Ozawa ........................ | 711/173 |
| 5,875,464 A | * | 2/1999 | Kirk ............................. | 711/129 |
| 5,974,438 A | * | 10/1999 | Neufeld ....................... | 709/104 |
| 6,038,571 A | * | 3/2000 | Numajiri et al. ............ | 707/206 |
| 6,269,425 B1 | * | 7/2001 | Mounes-Toussi et al. ... | 711/133 |
| 6,272,520 B1 | | 8/2001 | Sharangpani et al. ....... | 709/108 |
| 6,295,600 B1 | | 9/2001 | Parady ........................ | 712/228 |
| 6,298,418 B1 | | 10/2001 | Fujiwara et al. ............ | 711/144 |
| 6,317,819 B1 | | 11/2001 | Morton ........................ | 712/22 |
| 6,341,347 B1 | | 1/2002 | Joy et al. .................... | 712/228 |
| 6,353,569 B1 | | 3/2002 | Mizuno et al. ............. | 365/210 |
| 6,353,876 B1 | | 3/2002 | Goodwin et al. ........... | 711/143 |
| 6,453,385 B1 | * | 9/2002 | Sturges et al. .............. | 711/129 |
| 6,542,991 B1 | * | 4/2003 | Joy et al. .................... | 712/228 |
| 6,604,174 B1 | * | 8/2003 | Dean et al. .................. | 711/131 |

* cited by examiner

Primary Examiner—Nasser Moazzami
(74) Attorney, Agent, or Firm—Ritter, Lang & Kaplan LLP

(57) ABSTRACT

Techniques for implementing caches for context switching applications are provided. A context identifier is stored in the cache to indicate the context to which data in the cache is associated. Additionally, the context can have different priorities so that storage space in the cache can be more efficiently allocated to the contexts based on their priorities.

12 Claims, 6 Drawing Sheets

CACHING FOR CONTEXT SWITCHING APPLICATIONS

BACKGROUND OF THE INVENTION

The present invention relates to a cache for context switching applications. More specifically, the invention relates to a cache for priority-based context switching in embedded processor systems, such as for use in networks.

Embedded processor systems often strive to eliminate the amount of off-chip memory required. Reducing off-chip memory typically reduces overall cost and valuable board area. Also, any reduction in the amount of off chip traffic will allow for improved throughput, as well as reduced power consumption. Increased memory demands for embedded processors often occur due to the need to add more and more functionality into tiny form factors.

Conventional embedded processor systems typically rely on instruction and non-instruction caches to reduce the amount of data traffic. Caches are typically on-chip random access memorys (RAMs), which contain frequently accessed data (instructions or non-instructions). When designed properly, caches are an excellent choice for reducing the amount of off-chip memory needed while at the same time not inhibiting performance.

However, conventional cache designs are not well suited for context switching applications. This is because the cache designs depend on locality of reference for good performance. Locality of reference refers to the property that future instructions (or non-instruction data) in the code stream come from a location near the current instruction fetch or data access. Therefore, there is a higher probability of a cache hit (i.e., having the next instruction fetch already in the cache). This is normally the case with conventional code streams, since execution order is largely sequential in nature and hence the cache can react effectively to this deterministic behavior.

In stark contrast, code that rapidly context switches reacts in a random non-deterministic way. A context switch may involve a code fetch from a completely different address, which is nowhere near the current instruction fetch. Often times when two or more processes cannot fit in the cache, thrashing may result. Thrashing is overhead caused by repeatedly replacing and restoring cached data to the main off-chip memory in a rapid fashion. Therefore, the processor will waste many central processor unit (CPU) cycles just to manage the cache and thus, will not be performing useful work. Caching in that regard can actually hurt performance and waste power due to the extreme overhead seen with fruitless cache updates.

Additionally, many applications have contexts that have different priorities. The caching of instructions may result in lower performance in many real time operating system environments for high priority contexts. A cache miss at an inopportune time can slow down the performance where high performance is crucial in order to achieve a real time response. The cache overhead of flushing and reading/writing cached data to keep it consistent and coherent with the memory system impacts overall system performance since cache updates waste network or bus bandwidth.

Accordingly, it would be beneficial to have innovative techniques for implementing a cache for context switching applications. Additionally, it would be beneficial if the cache could maintain high performance for high priority contexts in applications where the contexts can have different priorities.

SUMMARY OF THE INVENTION

The present invention provides innovative techniques for a cache for context switching applications. In general, data is stored in a cache associated with an address. Additionally, a context identifier is also associated with the address. The context identifier uniquely identifies the context to which the data is associated (e.g., the context that was executing when the data was stored in the cache). By storing the context identifier in the cache, the cache can be more effectively optimized for context switching applications. Some specific embodiments of the invention are described below.

In one embodiment, the invention provides a method for implementing a cache for a processor executing multiple contexts. Data at an address from a memory is retrieved for a context. The data is stored in a cache associated with the address. Additionally, a context identifier for the context is stored in the cache associated with the address. In some embodiments, each context can have a priority and a higher priority context can be allocated more storage space in the cache than a lower priority context.

In another embodiment, the invention provides a method for implementing a cache for a processor executing a plurality of contexts. A request to access data at an address from a memory is received for a context. A cache is accessed to determine if the data for the address and the context are stored in the cache. In the cache, data and context identifiers are associated with addresses in the cache. If the data for the address and the context are stored in the cache, the request is filled with the data from the cache. Otherwise, if the data for the address in the context are not stored in the cache, the context is suspended.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments that implement a cache for context switching applications where context switches are implemented in hardware. However, embodiments of the invention are not limited to any particular environment, application or implementation. For example, the invention may be advantageously applied to other environments, including those where context switches are implemented in software. Therefore, the description of the embodiments that follows is for purposes of illustration and not limitation.

Figure 1:
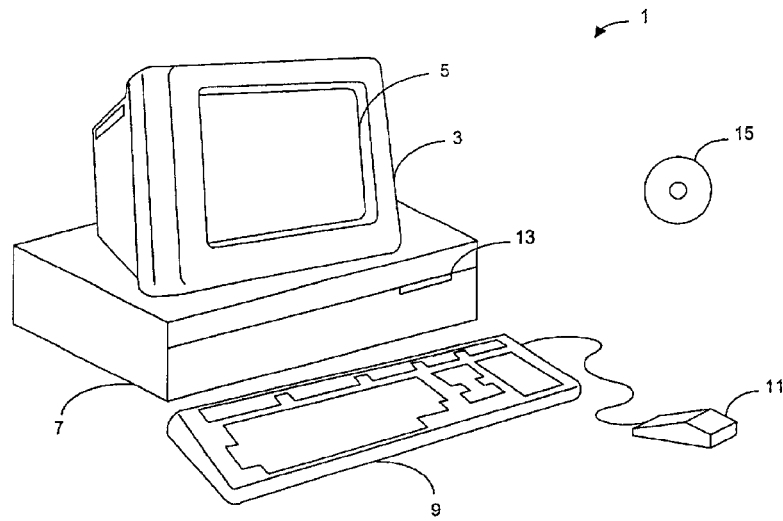
FIG. 1 illustrates an example of a computer system that can be utilized to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
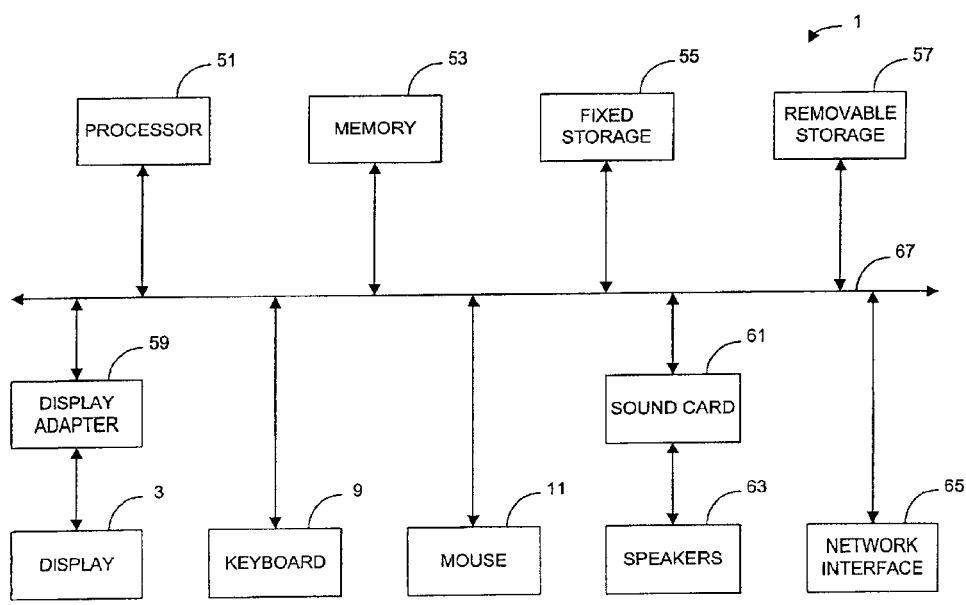
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
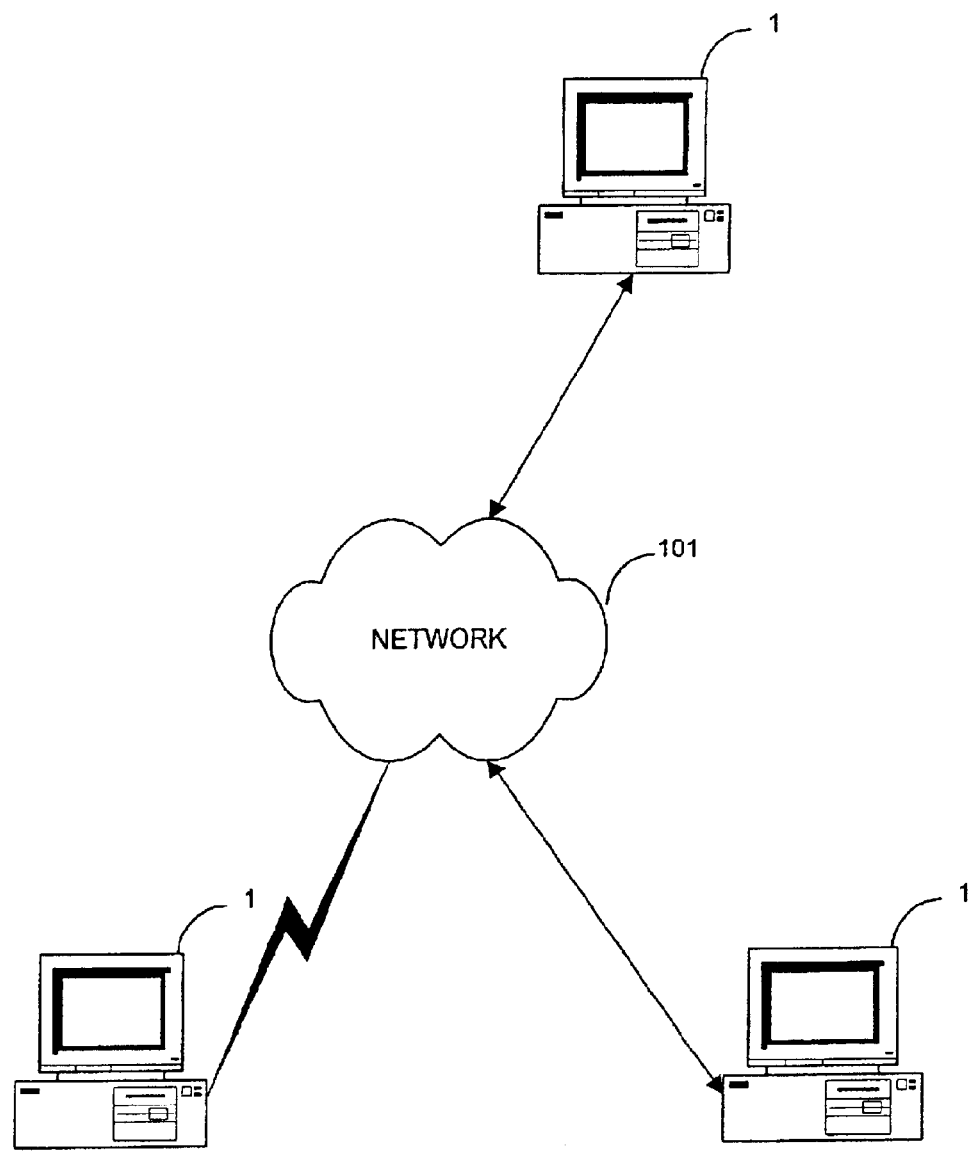
FIG. 3 shows a communications network including multiple computer systems.

FIG. 3 shows an example of a communications network including multiple computer systems. Network 101 facilitates communication between multiple computer systems 1. Computer systems 1 are representative of the multitude of hardware devices that can be present on network 101. Devices can communicate with other devices using wire, optical, wireless, and other media. Network 101 is representative of a local area network, wide area network (such as the Internet), or any combination of the two.

An embedded system in which an embodiment of the invention can be applied is a medium access control (MAC) processor for a wireless network, such as a local area network. The MAC layer resides between the internet protocol (IP) layer and the physical layer in a traditional 802 network architecture. Although an embodiment of the invention for this application will be described herein to aid the readers understanding of the invention, the invention is not limited by this description.

Figure 4:
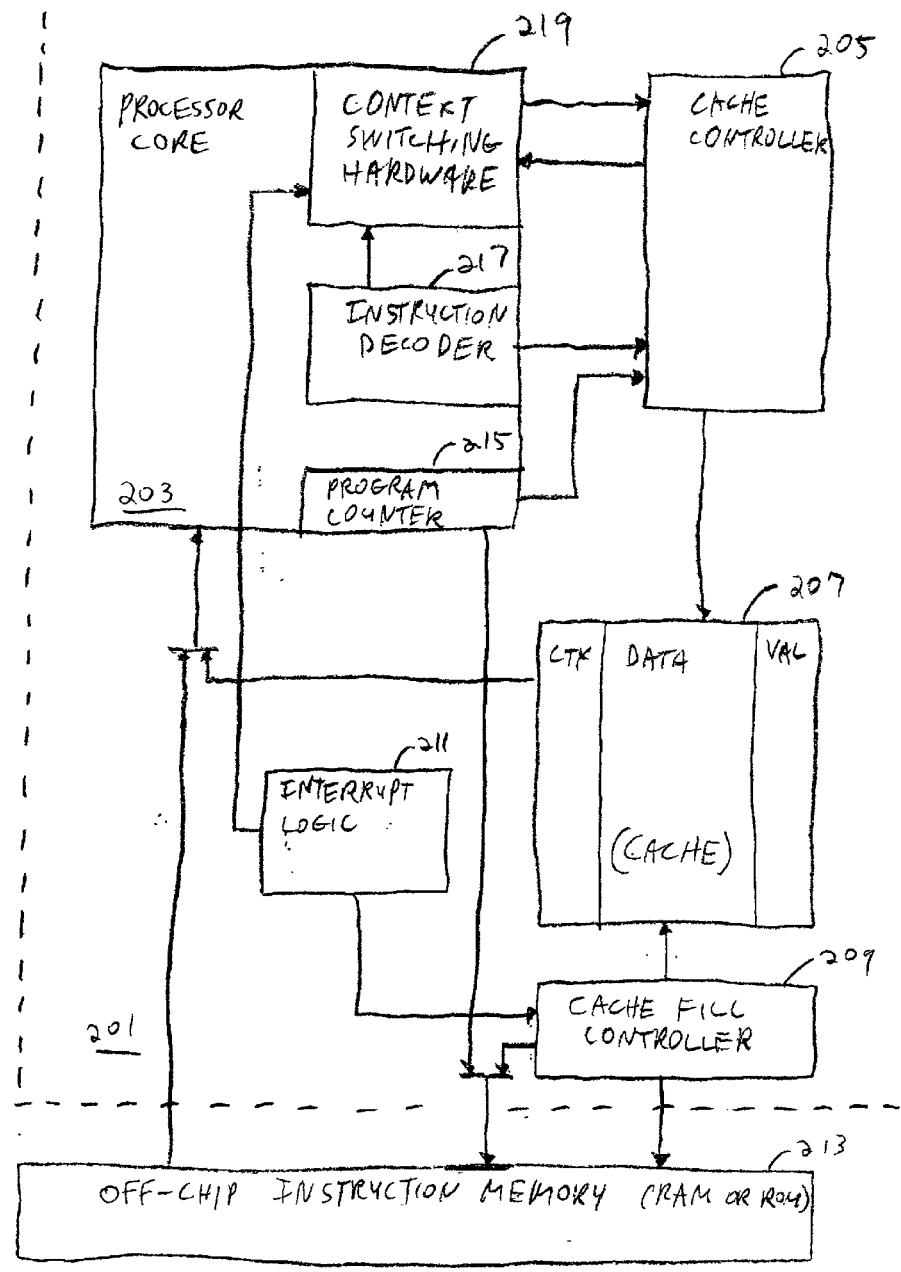
FIG. 4 shows a block diagram of an example of hardware for implementing embedded context switching applications.

FIG. 4 shows a block diagram of an embedded processor that utilizes an off-chip instruction memory. A chip 201 includes a processor core 203, a cache controller 205, a cache 207, a cache fill controller 209, and interrupt logic 211. Processor core 203 utilizes an off-chip instruction memory 213 which can be read only memory (RAM), read only memory (ROM), or any other type of memory. Although this embodiment will be described in reference to an off-chip instruction memory, the invention may be advantageously applied to caching any type of data, including data that are not instructions. Therefore, the term "data" will be used herein to describe both instructions and non-instructions.

Processor core 203 includes a program counter 215. The program counter is a register that can point to the next instruction to be executed. As shown, the address of the next instruction is input to cache controller 205 and off-chip instruction memory 213. In general, cache controller 205 accesses cache 207 to determine if the requested instruction is stored in the cache. If the instruction is stored in cache 207, the instruction is input to processor core 203. If the requested instruction is not stored in cache 207, the instruction is retrieved from off-chip instruction memory 213 and input into processor core 203. As shown, an instruction from off-chip instruction memory 203 can also be input to cache fill controller 209 so that the retrieved instruction can be stored in the cache so the instruction can be accessed locally on a subsequent data access.

Processor core 203 includes an instruction decoder 217 that decodes instructions for execution. Processor core 203 also includes context switching hardware 219 that switches the execution of contexts. Context switching 219 is responsive to input from instruction decoder 217 and interrupt logic 211. When an interrupt occurs that causes the context to be switched, interrupt logic 211 receives the interrupt and sends a signal to context switching hardware 219 instructing the context to be switched. Additionally, interrupt logic 211 sends a signal to cache fill controller 219 so that instructions can be pre-read for the next context.

In one embodiment, the different contexts are identified by a unique context identifier. The context identifier can utilize any number of different mechanisms to identify a context, such as a number, character, string, and the like. In the embodiment, shown in FIG. 4, the context identifier is a number.

Data that is stored in cache 207 is associated with an address (not shown) and a context identifier. The context identifier, in general, indicates the context that was executing when the data was retrieved and stored in cache 207. Typically, only the context that was executing when data was stored in the cache will be allowed to access that data (an example of an exception to this would be a shared data structure). When cache 207 is full, conventional techniques such as least recently used (LRU), round robin, and the like can be utilized to determine where the new data is stored.

In another embodiment of the invention, each context can have a priority. For example, a higher priority context can be allocated more storage space in cache 27 than a lower priority context. Additionally, if storage space allocated for a high priority context is all being used, the data can be stored in cache 207 in storage space allocated for a lower priority context. In this manner, higher performance for higher priority contexts can be achieved.

In some embodiments, the context identifier can be a number that also represents the priority of the context. In other embodiments, the priority can be different than the context identifier.

In embodiments of the invention that store non-instruction data in cache 27, it may be beneficial to use a flag to indicate whether the data is valid. The valid flag can be utilized for a number of purposes including indicating that the associated data is likely stale, specifically purging the data from the cache in write/through environment, and any other.

By storing a context identifier in cache 207, embodiments of the invention are able to achieve greater performance for context switching applications. Embodiments of the invention can be applied to instruction data, non-instruction data or any combination of the two. The above has described a hardware environment for an embodiment of the invention and the following will describe flowcharts of processes that can be implemented.

Figure 5:
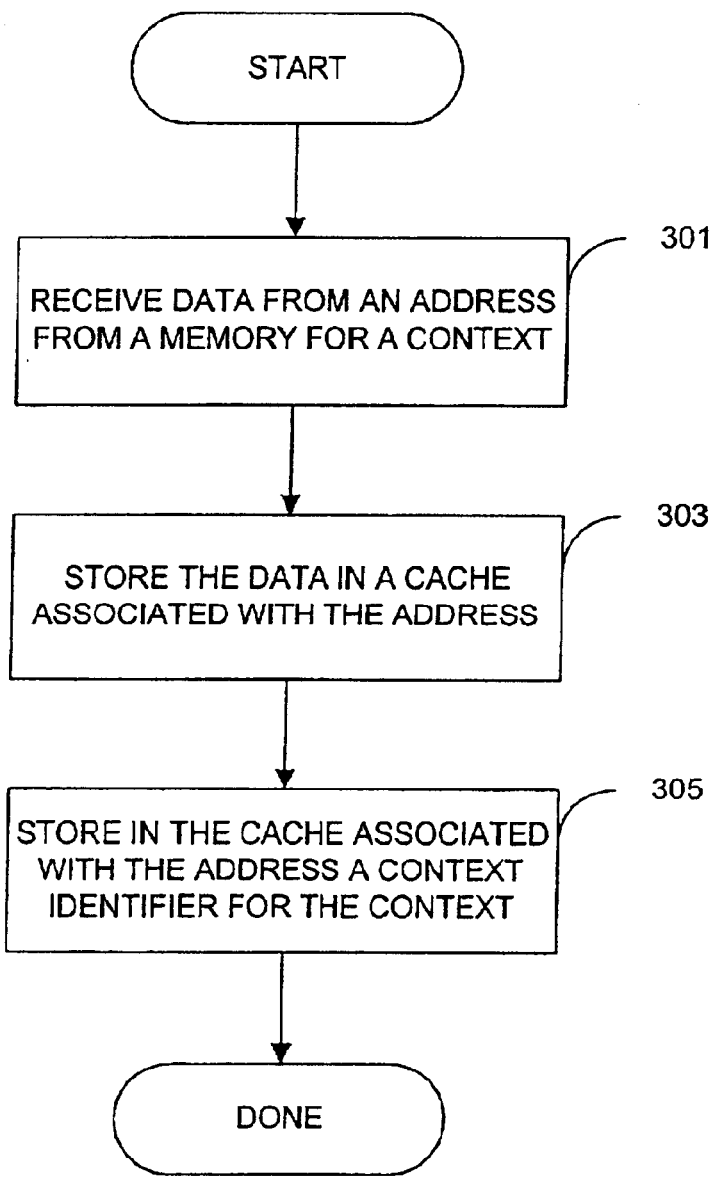
FIG. 5 shows a flowchart of a process of implementing a cache for a processor executing multiple context including storing a context identifier for the context in the cache associated with the address.

FIG. 5 shows a flowchart of a process of implementing a cache for a processor executing multiple contexts. As in all the flowcharts described herein, steps may be added, deleted, reordered, or combined without departing from the spirit and scope of the invention.

At a step 301, data is received at an address from a memory for a context. Typically, the data is retrieved from an off-chip memory, but the invention may be advantageously applied to on-chip memories or any other storage media.

The data is stored in a cache associated with the address at a step 303. A number of conventional techniques, such as hashing, can be utilized to increase the performance of accessing data in the cache.

At a step 305, a context identifier for the context that is executing is stored in the cache associated with the address. As stated earlier, the context identifier can be any number of formats. Typically, the format of the context identifier will be selected such that it allows the context to be uniquely identified efficiently.

Figure 6:
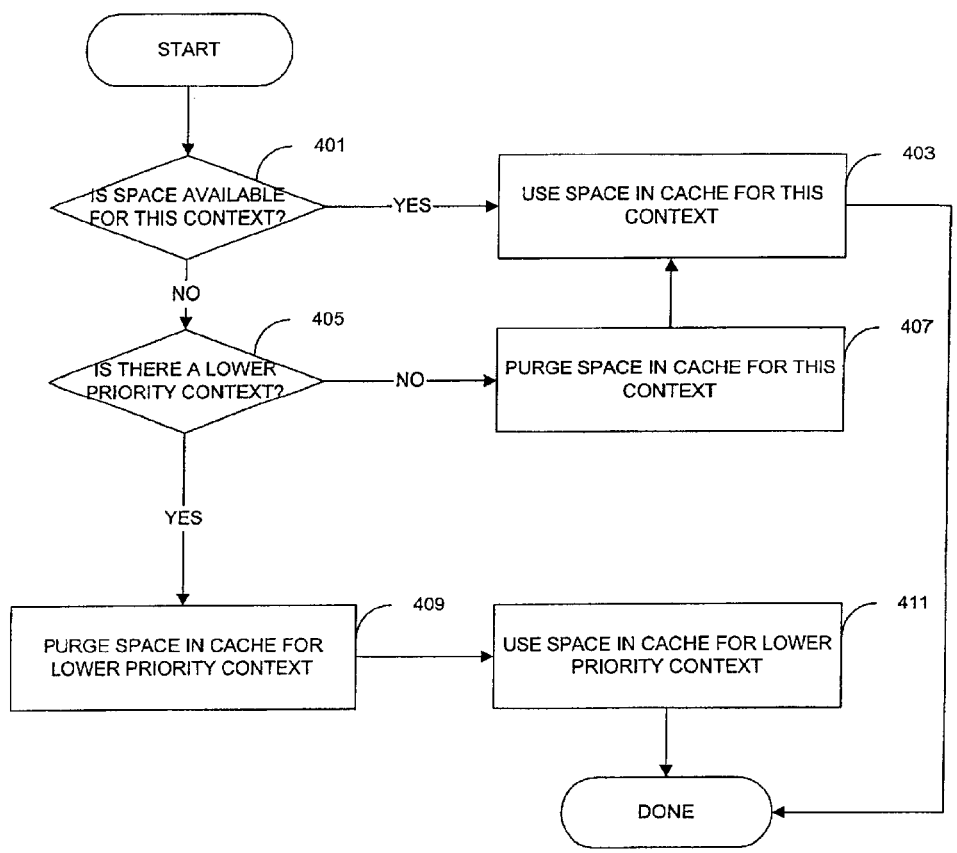
FIG. 6 shows a flowchart of a process of storing data in a cache where the contexts have different priorities.

FIG. 5 shows the storing of data in the cache, but this assumes that there is space available to store the data in the cache. FIG. 6 shows a flowchart of a process of determining whether there is space for the data in the cache in embodiments where the contexts have priorities associated with them. At a step 401, it is determined whether space is available in the cache for storing data for this context. As mentioned earlier, higher priority contexts can be allocated more storage space in the cache than lower priority contexts. In other embodiments, all contexts can be allocated the same amount of storage space in the cache. The priority of contexts will be utilized in FIG. 6 in order to allow higher priority contexts to utilize the storage space of lower priority contexts, when necessary.

If it is determined that storage space is available for this context at step 401, the space in the cache for this context is used at a step 403. Therefore, the data is stored in the cache in space that was allocated for this context. Additionally, in some embodiments, storage space can be allocated in the cache that can be utilized by any context.

If it is determined at step 401 that space is not available in the cache for this context, it is determined at a step 405 whether there is a lower priority context. If there are no lower priority contexts at step 405, storage space in the cache for this context is purged. The storage space may be purged in a number of different ways including setting a valid flag in the cache, writing the data to the cached memory, and the like. Now that storage space is available in the cache for this context, the space is used at step 403 for storing the data.

If it is determined at step 405 that there is a lower priority context, storage space in the cache for the lower priority context is purged at a step 409. If there are multiple lower priority contexts, some embodiments choose the context with the lowest priority. At a step 411, storage space in the cache for the lower priority context is used to store the data for the current, higher priority, context.

Figure 7:
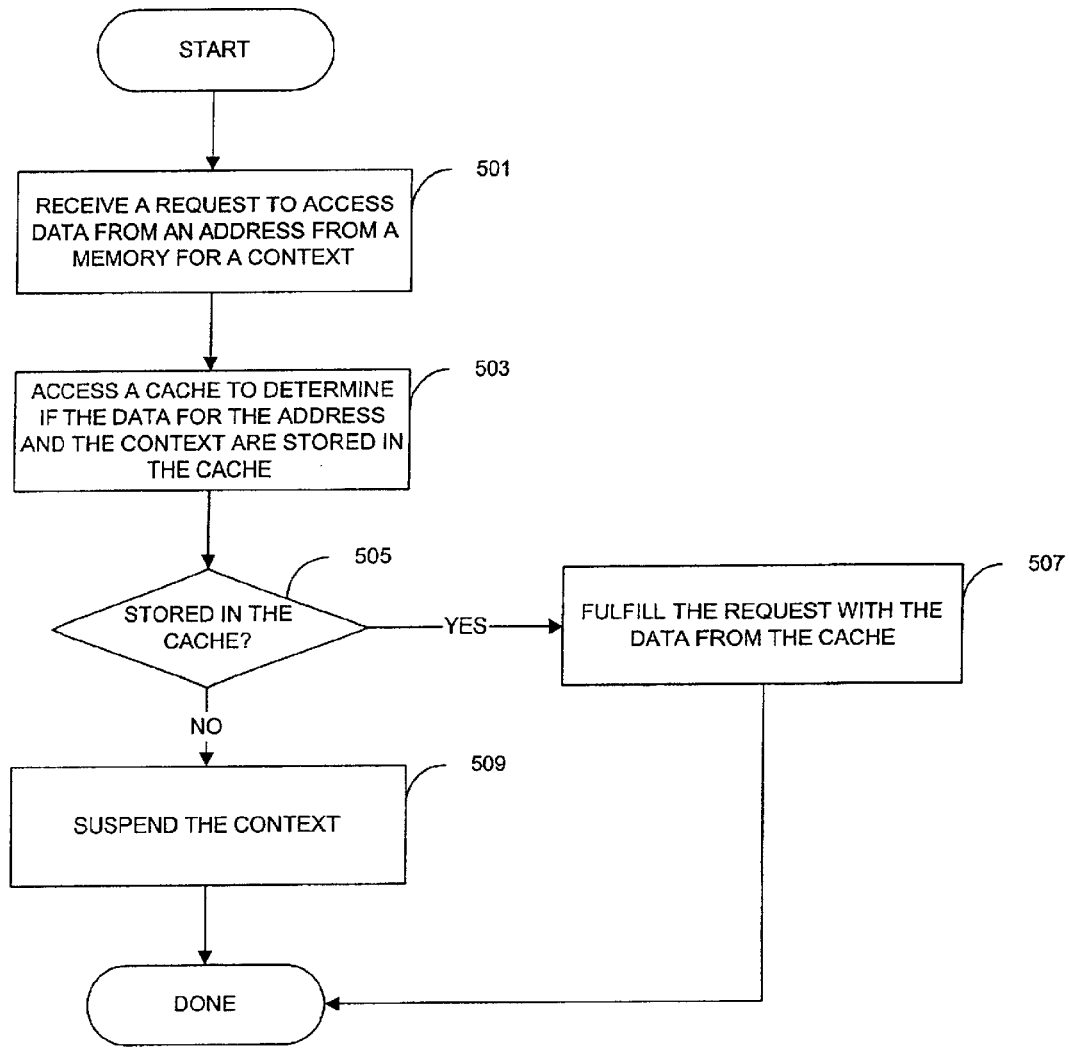
FIG. 7 shows a flowchart of a process of implementing a cache for a processor executing multiple contexts where the context is suspended if data that has been requested from the cache is not available in the cache.

Some embodiments of the invention include a feature that when requested data is not found in the cache, the requesting context is suspended and another context is allowed to execute while the data for the requesting context is retrieved from the off-chip memory or other storage media. The requesting context can be resumed once the requested data is available, such as in the cache or another storage medium. FIG. 7 shows a flowchart of a method of implementing a cache for processor executing multiple contexts in which a context is suspended if the data for the address and the context that is requested is not stored in the cache.

At a step 501, a request to access data at an address from a memory for a context is received. As with any data, the data can be instruction data or non-instruction data.

The cache is accessed to determine if the data for the address and the context are stored in the cache at a step 503. Typically, the context is identified by a context identifier.

If at a step 505 it is determined that the requested data is stored in the cache, the request is fulfilled with the data from the cache at a step 507. Otherwise, if it is determined that the data is not stored in the cache at step 505, the context is suspended at a step 509.

By suspending the context that is requesting data from the cache where the data is unavailable in the cache, other contexts can be allowed to execute while the requested data is retrieved from the off-chip memory. Typically, the suspended context will be allowed to resume execution once the requested data has been retrieved and stored in the cache.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A method for implementing a cache for a processor executing a plurality of contexts, comprising:

retrieving data at an address from a memory for a context, wherein each context has a priority;

storing the data in the cache in storage space allocated for a lower priority context if storage space allocated for the context is being used;

storing the data in the cache associated with the address; and storing in the cache associated with the address a context identifier for the context.

2. The method of claim 1, wherein a higher priority context is allocated more storage space in the cache than a lower priority context.

3. The method of claim 1, wherein the data is an instruction.

4. An apparatus for executing a plurality of contexts, comprising:

a processor;

a memory that stores data for the processor; and a cache that stores data associated with an address from the memory and a context identifier for a context that requested the data, wherein each context has a priority and the data is stored in the cache in storage space allocated for a lower priority context if storage space allocated for the context is being used.

5. The apparatus of claim 4, wherein a higher priority context is allocated more storage space in the cache than a lower priority context.

6. The apparatus of claim 4, wherein the data is an instruction.

7. A computer program product that implements a cache for a processor executing a plurality of contexts, comprising:

computer code that retrieves data at an address from a memory for a context, wherein each context has a priority;

computer code that stores the data in the cache in storage space allocated for a lower priority context if storage space allocated for the context is being used;

computer code that stores the data in the cache associated with the address;

computer code that stores in the cache associated with the address a context identifier for the context; and a computer readable medium that stores the computer codes.

8. The computer program product of claim 7, wherein a higher priority context is allocated more storage space in the cache than a lower priority context.

9. The computer program product of claim 7, wherein the data is an instruction.

10. An apparatus for executing a plurality of contexts, comprising:

means for retrieving data at an address from a memory for a context, wherein each context has a priority;

means for storing the data in the cache in storage space allocated for a lower priority context if storage space allocated for the context is being used;

means for storing the data in the cache associated with the address; and means for storing in the cache associated with the address a context identifier for the context.

11. The apparatus of claim 10, wherein a higher priority context is allocated more storage space in the cache than a lower priority context.

12. The apparatus of claim 10, wherein the data is an instruction.

* * * * *